March 29, 1932.  C. G. JONES ET AL  1,851,517
PIPE WELDING DEVICE
Filed Aug. 12, 1930  3 Sheets-Sheet 1

INVENTORS
Carl G. Jones and
Lewis R. Smith.
BY Wesley S. Carr
ATTORNEY

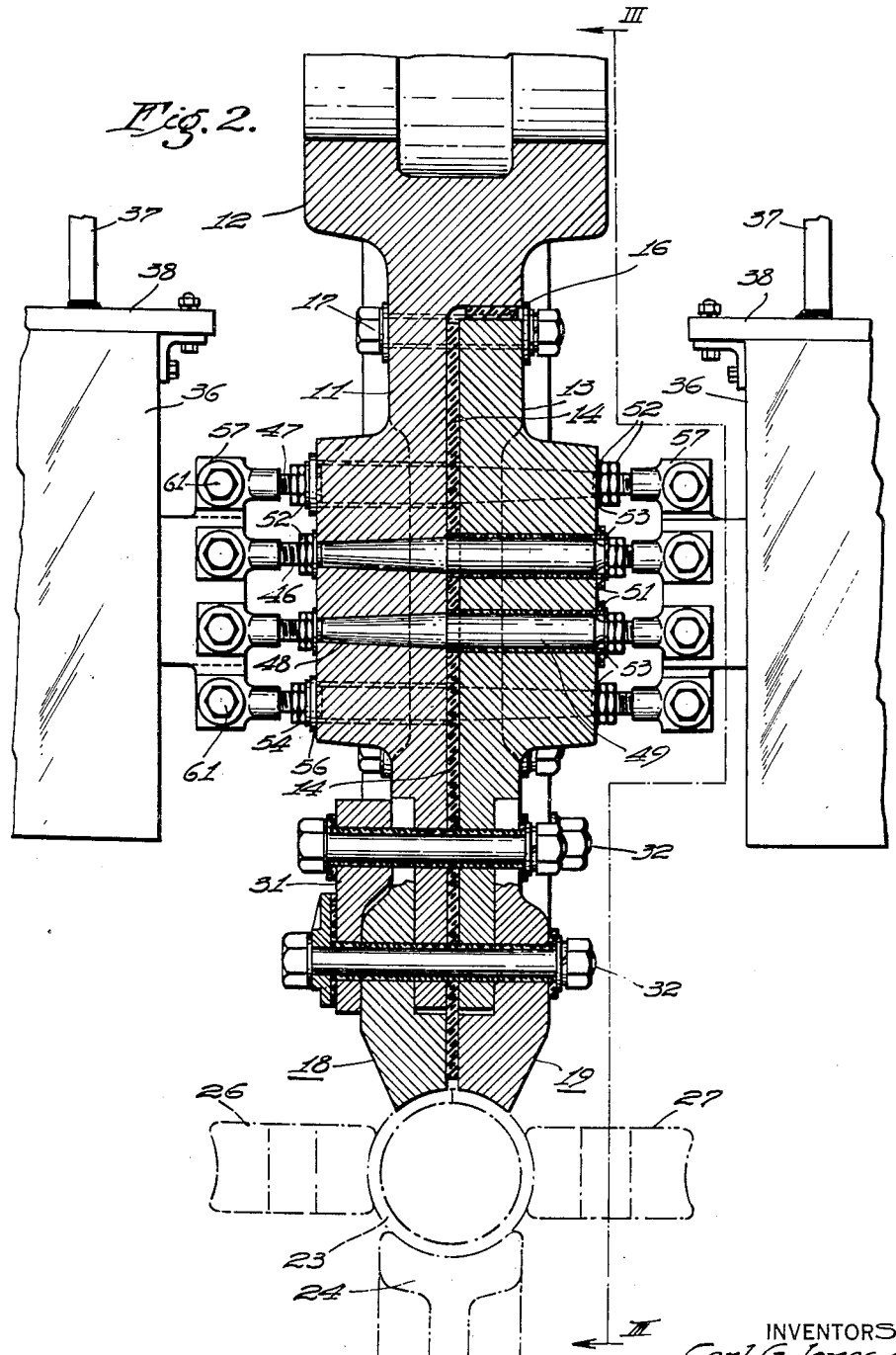

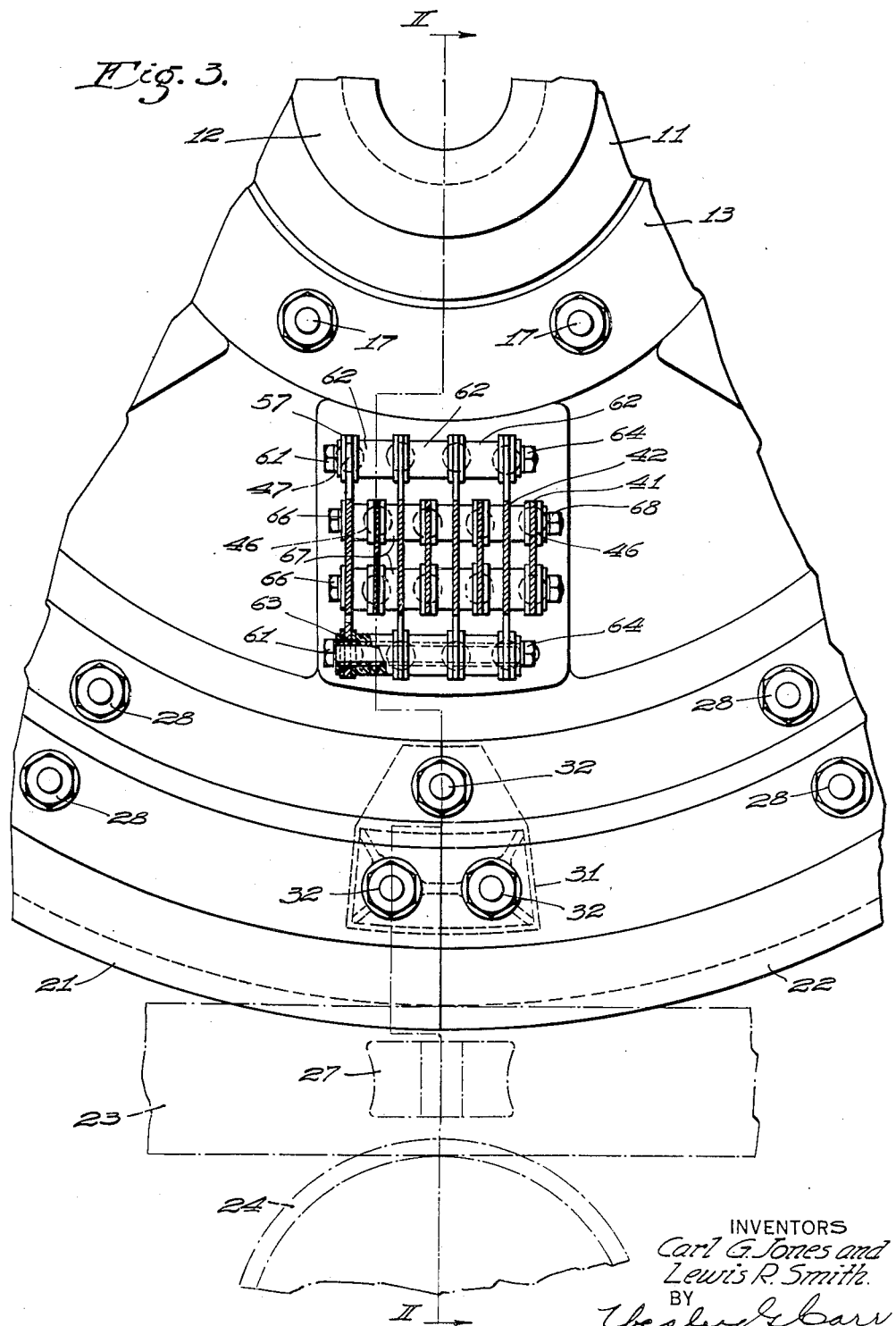

Patented Mar. 29, 1932

1,851,517

UNITED STATES PATENT OFFICE

CARL G. JONES, OF WILKINSBURG, AND LEWIS R. SMITH, OF EDGEWOOD, PENNSYLVANIA, ASSIGNORS TO WESTINGHOUSE ELECTRIC AND MANUFACTURING COMPANY, A CORPORATION OF PENNSYLVANIA

PIPE WELDING DEVICE

Application filed August 12, 1930. Serial No. 474,690.

Our invention relates to welding devices and particularly to electric pipe-welding devices.

An object of our invention is to provide a relatively simple, inexpensive and properly operable rotatable structure for welding pipe blanks.

Another object of our invention is to provide a novel form of electric connection between a pair of rotatable annular electrodes and a transformer rotating therewith.

Another object of our invention is to provide a novel form of electrical connection between the two semi-annular portions of annular electrodes that shall be unaffected by minor variations in the shape of the electrodes caused by temperature variations and by a varying point of application of welding pressure.

In practicing our invention, we provide a pair of rotatably mounted metal discs, electric insulating material therebetween, a pair of opposed and cooperating annular electrodes clamped against the metal discs and a plurality of metal studs having electric-conducting connection with the respective discs in alternation, as well as opposed pairs of transformers rotating with the discs and electrodes and having terminals of similar polarity connected to the two ends of a stud, the current-conducting connections between the studs and transformers of opposite polarity being interleaved.

In the drawings,

Fig. 2 is a view, in radial section through a portion thereof and on an enlarged scale, taken on the line II—II of Fig. 3, Fig. 3 is a fragmentary view, in end elevation, and on an enlarged scale, taken on the line III—III of Fig. 2.

Figure 1:
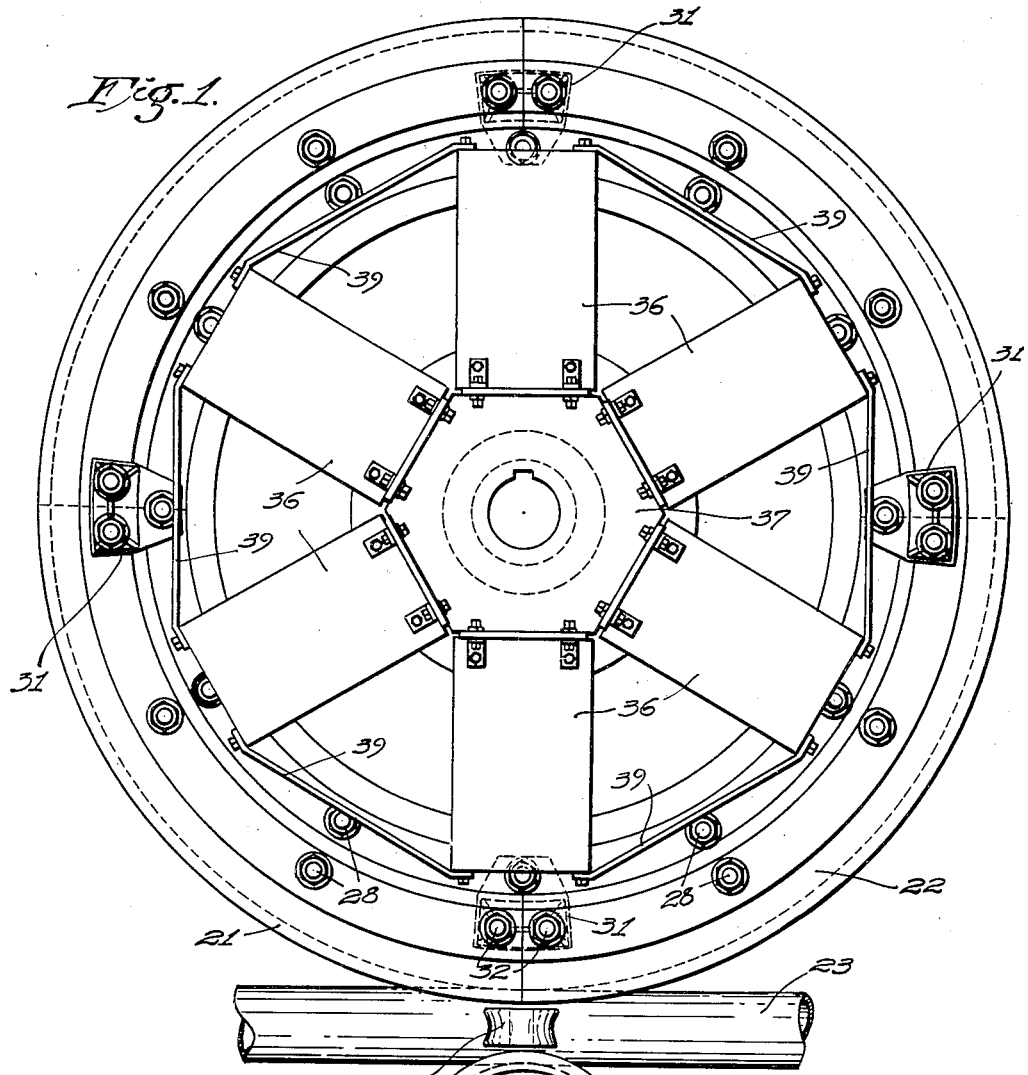
Figure 1 is a view, in end elevation, of a device embodying our invention.

Our invention relates more particularly to that type of electric welding machine which includes a rotatable wheel structure, the periphery of which is constituted by annular electrodes adapted to engage a pipe blank to be butt welded by current conducted to the pipe blank by the electrodes, and relates more particularly to current-conducting connections between secondary sources of electric energy and the electrodes.

Reference may be had initially to Fig. 2 of the drawings, in which we have illustrated one-half of a wheel structure embodying a main metal disc 11 which includes a hub portion 12 to permit of the wheel structure being mounted on a shaft (not shown in the drawings) in order that the structure may be rotatably mounted, in a manner well known in the art. An auxiliary or second metal disc 13 is provided, which may be of larger internal diameter than the main metal disc 11 to interfit with it, and disc 11 is provided with a recess in one of its lateral faces, of such shape and dimensions as to receive the second disc 13, the external diameter of the two discs being the same.

A layer of solid electric-insulating material 14 is provided between the two discs in order to maintain them in spaced relation to each other, and an annular or tubular member 16, of electric-insulating material, may be located between the inner peripheral surface of disc 13 and the hub portion of the main disc 11. The inner peripheral edge of disc 13 is secured in proper operative relation to disc 11 by a plurality of bolts 17 which are electrically insulated from both metal discs by suitable tubular members surrounding the bodies of the bolts and by washers under the head and the nut of each bolt.

A pair of annular electrodes 18 and 19 are provided, each including two semi-annular portions 21 and 22, the radial section of each of the semi-annular portions being of substantially L-shape, as is shown more particularly in Fig. 2 of the drawings. The two annular electrode structures are located in opposed spaced relation to each other, and their inner radial surfaces are in direct operative engagement with the outer flat radial surfaces of the discs 11 and 13, substantially as shown in Fig. 2 of the drawings. The peripheral surfaces of the annular electrode structures 18 and 19 are of arcuate shape in a radial direction, the radius of the arc being substantially that of the outside radius of the particular pipe to be welded, which pipe is indicated in broken lines and designated by numeral 23 in Figs. 1, 2 and 3 of the drawings, it being understood that the scales of the dimensions of these different figures of the drawings are not the same. A plurality of additional rollers 24, 26 and 27 are provided, these elements being shown in broken lines to indicate that they may be used but that they constitute no part of our present invention.

A plurality of clamping bolts 28 are located in peripherally spaced relation intermediate the inner and outer peripheries of the discs 11 and 13 and are to be understood as being electrically insulated from the discs 11 and 13. At the joints of the semi-annular electrodes 21 and 22, which abutting ends are to be understood as being in operative engagement, we provide substantially flat clamping plates 31, the inner surface of which may be shaped to correspond to the outer surface of the annular electrode structure against which it is to rest in order to tightly clamp the electrode structure against the outer peripheral edge of the metal disc, the clamping plates 31 constituting also a means for conducting electric current from one of the semi-annular electrode members to the adjacent semi-annular electrode. A plurality of relatively heavy bolts 32 are provided, one or more of these bolts extending through the inner portion of each of plates 31, and two or more spaced bolts extending through the outer portion of each of the plates 31, the outer bolts extending through the end portions of each of the adjacent semi-annular electrodes 21 and 22. Suitable electric-insulating material is provided between the body of each bolt and the head and nut thereof in order that a tight clamping engagement may be effected without providing an electric-conducting connection between the opposed electrode structures.

As is shown more particularly in Fig. 1 of the drawings, the semi-annular electrodes are located in staggered relation to each other so that the joints on opposite sides of the structure will be displaced 90° from each other. This will insure that, at the instant when a joint between two abutting semi-annular electrodes is in direct operative engagement with a pipe blank, as is shown in Figs. 1 and 3, the opposite annular electrode structure will have a continuous portion thereof in engagement with the pipe blank at the point where the weld is being effected.

A plurality of opposed pairs of transformers are provided and may have the inner end portions of their metal structure 36 bolted against a support which includes a hub 37 of metal, the outer periphery being of polygonal shape to correspond to the number of transformers provided in the structure. We have shown six such transformers, each of which may be suitably bolted or otherwise secured against a plate 38, which, in turn, may be welded to the hub 37 which is to be understood as being provided with an opening therethrough to support the same on the shaft extending through the hub 12. The transformer metal structures may be connected by tie rods 39, the ends of which are suitably bolted thereto. It may be here mentioned that the lineal speed of the pipe and, therefore, of the electrodes will be relatively low, viz: on the order of six inches to ten inches travel per second, so that there will be no question as to centrifugal forces of relatively large magnitude having to be compensated for or otherwise taken care of.

Figure 4:
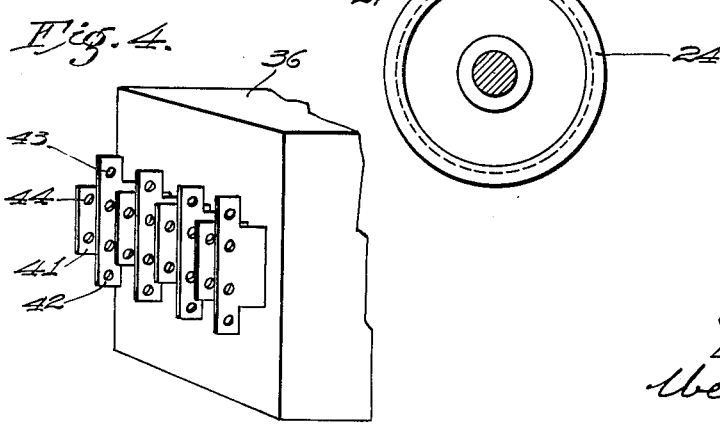
Fig. 4 is a view, in perspective, of one end of a transformer showing the interleaved terminals of a transformer.

Referring particularly to Fig. 4 of the drawings, we have there illustrated a plurality of terminal members 41 and 42, a total of four terminal members 41 of one polarity being illustrated as being located in alternation with four terminal members 42 of the opposite polarity. The respective terminals 41 and 42 are of different widths for a purpose which will hereinafter appear, the wider terminals 42 being provided with four spaced openings 43 therethrough, and the narrower terminals 41 being provided with two spaced openings 44, all of these openings being located in aligned relation, as is shown in Fig. 4 of the drawings.

Reference may now be had to Fig. 2 of the drawings, in which we have illustrated a novel form of means for electrically connecting the terminal members 41 and 42 of oppositely disposed transformers to the metal discs 11 and 13 in proper alternation to effect connection of terminals of like polarity in the opposed transformers to one of the metal discs. A plurality of metal studs 46 and 47 are provided, each stud extending through a thickened portion of the discs 11 and 13 and being provided with a tapered portion 48 and a substantially straight cylindrical portion 49, the discs being provided with aligned openings extending laterally therethrough so that the tapered or conical portion 48 of each stud may fit tightly into a conical opening in one of the discs, while the straight cylindrical portion of the same stud fits into an opening having a larger diameter than the diameter of the straight cylindrical portion 49, electric-insulating material 51 being located between the second disc and the straight cylindrical portion in order to insure that there shall be no accidental engagement between the studs and the second metal disc.

The studs 46 and 47 extend in alternately opposite directions laterally of the discs 11 and 13 and are held in their proper operative positions by a plurality of nuts 52, a washer 53 being provided, as is usual.

The location of the studs 46 and 47 is shown in Fig. 3 of the drawings from which it will be noted that these studs are radially and tangentially aligned and spaced from each other in substantially straight and parallel-extending lines, for a purpose which will hereinafter appear. Nuts 54 are provided on the straight end of each stud, together with a washer 56 of electric-insulating material, in order to insure that no dust or minute particles of metal shall be lodged on the plane surfaces of the discs 11 and 13 adjacent to the studs, which might cause a ground or a short circuit between the energized studs and the metal disc of opposite polarity.

Terminal members 57 have screw threaded engagement with the threaded ends of the respective studs 46 and 47, the outer ends of the terminals 57 being of switch-jaw construction, that is, they may include two spaced flat portions with aligned openings therethrough.

Reference was hereinbefore made to the terminal members 41 and 42 of each of the transformers as including relatively thin flat plates, and these plates are to be located in the switch-jaw terminal portions of members 57, as is shown more particularly in Fig. 3 of the drawings. It is evident that, in the assembly of the structure, each transformer may be moved radially inward, and that the terminal plates 41 and 42 will properly interfit with the terminal members 57. It is evident also that the transformer may be moved into its proper operative position axially of the rotatable structure, and that the same ease of interfitting engagement will be had.

The radially innermost row of terminal members of the studs 47 have a single bolt 61 extending therethrough in a substantially tangential direction, spacing members 62 being provided between the respective terminals 57, and the bolt 61 being surrounded by a tubular member 63 of electric-insulating material. A clamping nut 64 is located on each of the bolts 61. The terminal members 57 of studs 46 have a bolt 66 extending therethrough, relatively short members 67 of electric insulating material being provided between the terminal members 57 on these studs and the bars 42, a clamping nut 68 being provided on each of the bolts 66 to tightly clamp all of the members through which the bolts 66 extend. In general, the structure just described, including the bolts 61 and 66, is effective to ensure a close electric-conducting engagement between the terminal bars or strips 41 and 42 of the respective transformers and the proper stud 46 or 47 which, in turn, have close operative engagement with either the one or the other of the metal discs 11 and 13.

We wish here to point out that, in addition to the ease of connection or disconnection between the transformer and the studs, as already set forth, the terminals of the transformers and also the studs 46 and 47 are interleaved, as regards the polarity thereof, an important consideration when it is remembered that the value of the current flowing between the studs and the individual transformers is on the order of thousands of amperes of alternating current, and that it is not only desirable but necessary to interleave the conductors in order to reduce the inductance and, therefore, the voltage drop in the conductors to as great an extent as may be possible. It may also be noted that the length of conductor between a disc and a transformer has been made as short as is consistent with the mechanical construction of the device.

Since various modifications may be made in the device embodying our invention without departing from the spirit and scope thereof, we desire that only such limitations shall be placed thereon as are imposed by the prior art or are set forth in the appended claims.

We claim as our invention:

1. A pipe-welding device including a rotatably mounted pair of spaced cooperating annular electrodes and a transformer rotating therewith, a current supply for said electrodes including a main metal disc and an auxiliary metal disc respectively engaging the annular electrodes, insulation between said discs, bolts clamping the annular electrodes against the respective discs and the discs against the interposed insulation, a plurality of alined openings extending laterally through said discs, the opening in one disc being of straight cylindrical shape and the alined opening in the other disc being of conical shape, metal studs extending through said aligned openings, insulation between each stud and the wall of the opening of straight cylindrical shape, a securing nut on each stud to hold it in the conical opening, and electrical connections between the transformers and the respective pairs of studs.

2. A pipe-welding device including a rotatably mounted pair of spaced cooperating annular electrodes and a rotatably mounted transformer, an electrode-supporting and current-conducting structure including a pair of spaced opposed metal discs respectively engaging the annular electrodes, at least one of which embodies a hub for mounting it on a shaft, electric insulating material between said metal discs and between said annular electrodes, clamping bolts extending through said pairs of annular electrodes and discs, a plurality of metal studs extending in alternately opposite directions laterally through and beyond the pairs of metal discs and each stud electrically engaging one of said metal discs, and means for electrically connecting the terminals of the transformer winding to different studs.

3. A pipe-welding device including a pair of spaced cooperating annular electrodes and a pair of opposed spaced rotatably mounted transformers, an electrode-supporting and current-conducting structure including a pair opposed metal discs having flat axial surface engagement with the respective annular electrodes, electric-insulating material between the metal discs and between the annular electrodes, clamping bolts extending laterally through the annular electrodes and the metal discs, a plurality of metal studs extending in alternately opposite directions laterally through said metal discs, each stud having a supporting and electric-conducting engagement with one metal disc, and electric-conducting connections between a stud and terminals of similar polarity on the pair of transformers.

4. A pipe-welding device including a pair of spaced cooperating annular electrodes and a pair of opposed spaced rotatably mounted transformers, an electrode-supporting and current-conducting structure including a pair of opposed metal discs having flat axial surface engagement with the respective annular electrodes, electric-insulating material between the metal discs and between the annular electrodes, clamping bolts extending laterally through the annular electrodes and the metal discs, a plurality of tangentially spaced sets of spaced metal studs extending laterally through the pairs of metal discs, the sets of studs being in parallel spaced alignment and the studs in alternate sets having a conical supporting and electric-conducting engagement with the respective opposite discs, the nuts on said studs serving to draw them into close engagement with their supporting discs, and current-conducting connections between a stud and the terminals of similar polarity on the pair of transformers.

5. A pipe-welding device including a pair of spaced cooperating annular electrodes and a pair of opposed spaced rotatably mounted transformers, an electrode-supporting and current-conducting structure including a pair of opposed metal discs having flat axial surface engagement with the respective annular electrodes, electric-insulating material between the metal discs and between the annular electrodes, clamping bolts extending laterally through the annular electrodes and the metal discs, a plurality of radially and tangentially aligned and spaced metal studs extending laterally through the pairs of metal discs, the radially aligned sets of studs extending parallel with each other, and the tangentially alternate sets of metal studs having supporting and electric-conducting engagement with the respective opposite metal discs, electric-conducting connections between the two ends of each stud and the terminals of similar polarity on the pair of transformers and a clamping bolt extending through each set of tangentially aligned electric-conducting connections.

6. The device of claim 3 characterized in that the transformer terminals and the metal studs are alined to effect removal of the transformer in a radial direction relatively to the shaft.

7. The device of claim 4 characterized in that the terminals of the transformers and the metal studs are alined to effect removal of the transformers in a direction radially of the discs.

8. The device of claim 3 characterized in that the transformer winding connected to the metal studs includes a plurality of sections, the terminals thereof of opposite polarity being located in alined spaced sequence.

In testimony whereof, we have hereunto subscribed our names this 11th day of August, 1930.

CARL G. JONES.
LEWIS R. SMITH.